DEPOSITION CHAMBER INCLUDING HEATER ELEMENT
ENVELOPED BY A QUARTZ WORKHOLDER

Filed Aug. 21, 1961

INVENTOR
EDWARD C. SCHAARSCHMIDT
BY
ATTORNEY

United States Patent Office 3,220,380

Patented Nov. 30, 1965

3,220,380

DEPOSITION CHAMBER INCLUDING HEATER ELEMENT ENVELOPED BY A QUARTZ WORK-HOLDER

Edward C. Schaarschmidt, Cranford, N.J., assignor to Merck & Co., Inc., Rahway, N.J., a corporation of New Jersey Filed Aug. 21, 1961, Ser. No. 132,649

1 Claim. (Cl. 118—48)

Figure 1:
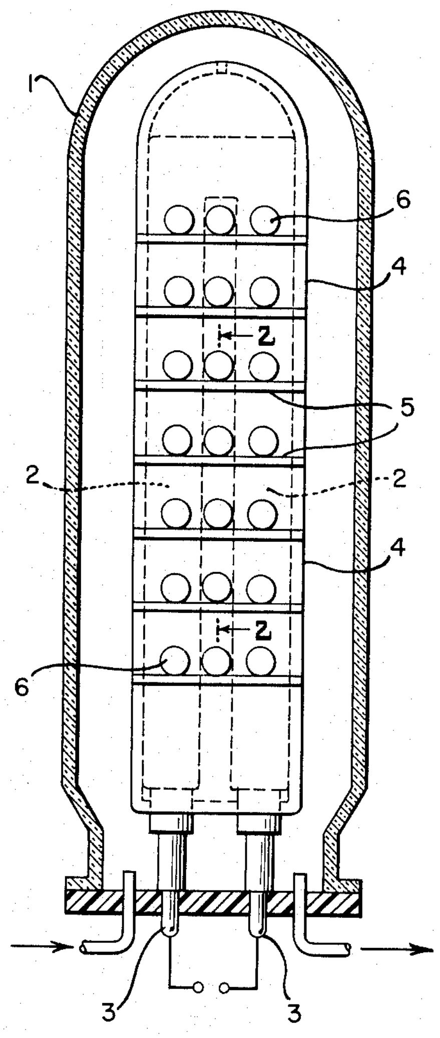

This invention relates to vapor growth of semiconductor bodies and, more particularly, to a heater apparatus for producing such bodies of predetermined conductivity type and degree from the vapor phase.

In the process of growth of semiconductor bodies, such as those made from germanium and silicon, from the vapor phase, deposition of semiconductor materials and active impurities therewith is effected upon semiconductor wafers heated by conduction from an electrically heated support. This method leads to the formation of a single crystalline semiconductor body which includes a plurality of layers of single crystal semiconductor material having different conductivities separated by a junction region. During this process it is observed that the heater material itself contributes undesired and uncontrollable amounts of active impurities to the vapor deposited material.

What is described herein is an advantageous heater assembly which permits growth of such semiconductor bodies under more ideal conditions. An advantage of the heater system of the present invention is that it markedly reduces impurity contamination from the heater, thereby permitting a closer control of the conductivity type and degree of the vapor-deposited semiconductor layers. Another advantage of the apparatus of the present invention is that it provides a more uniform temperature for a plurality of semiconductor wafers positioned on a heater assembly. Still another advantage of the apparatus described herein is that it increases the reactor capacity for a plurality of semiconductor wafers as compared to previous heater designs. A specific advantage of the present apparatus is that it enables the deposition of P-type germanium layers on N-type germanium wafers having a resistivity of about 0.5 ohm-centimeter and greater.

Accordingly, it is an object of the present invention to provide an improved heater apparatus for use in a process of vapor deposition of semiconductor bodies.

Still another object of the invention is to provide a resistance heater assembly for a plurality of semiconductor wafers used as substrates in the growth of semiconductor layers from the vapor phase, which assembly does not contribute undesired impurities at high temperatures, and which apparatus enables the plurality of wafers to be heated to a more nearly uniform temperature which increases the reactor capacity for such wafers and which enables the preparation of semiconductor layers with a high degree of crystalline perfection and with a predetermined conductivity type and degree.

A more specific object of the invention is to provide a heater assembly which enables the growth of P-conductivity type germanium semiconductor bodies from the vapor phase onto N-conductivity type germanium wafers having a resistivity in the order of 0.5 ohm-centimeter and greater.

Figure 2:
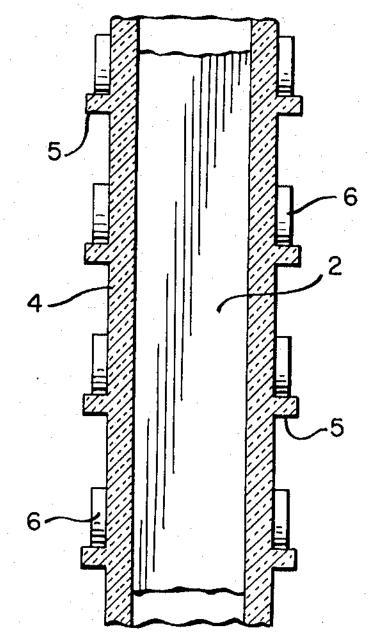

These and other objects will be made apparent from the following more detailed description of the invention in which reference will be made to the accompanying drawings, in which:

FIG. 1 is a schematic illustration of the heater assembly of the present invention; and FIG. 2 is a more detailed view of the apparatus of FIG. 1, in section, taken along lines 2—2 of FIG. 1.

In accordance with the present invention, there is provided a heater assembly for use in growing semiconductor bodies from the vapor phase. Briefly, the process of growth of semiconductor material from the vapor phase includes the steps of providing a conducting support within a reaction chamber, positioning a plurality of semiconductor substrate wafers on said support, heating said support thereby heating the wafers from heat from the support and, finally, contacting the thus-heated semiconductor wafers with a source of decomposable semiconductor atoms and active impurities therewith to effect deposition of these atoms to form a single crystal layer of semiconductor material on the wafers.

Referring now to FIGS. 1 and 2, there is shown in schematic illustration only, the heater apparatus of the present invention. Such apparatus includes a reactor chamber 1 in which is mounted an electrically conductive heater element 2. While generally high melting metals may be used as such an element, according to the present invention it is desirable that the element be fabricated of graphite material in the shape of a single piece having a flat, rectangular cross-section. The heater element is connected to electrodes 3 which terminate at the base of the reactor and by means of which the heater may be connected to a source of electric current (not shown) and thereby heated electrically to a desired elevated temperature at which deposition takes place. Alternatively, the heater may be heated inductively.

Enclosed within the heater element is an envelope 4 which completely surrounds the heater. An envelope fabricated from a high melting inert material, such as quartz, is suitable. The combination of a graphite heater and a quartz envelope is a preferred one according to the present invention since it has a low temperature coefficient of resistivity and, therefore, provides a uniform temperature throughout the length thereof.

The envelope 4 has a plurality of ledges 5 upon which are mounted a plurality of semiconductor wafers 6. Such wafers may be heated to within a temperature difference of 5 degrees from each other, using the heater assembly described herein.

While the following more detailed description of the invention will be described with reference to the deposition of germanium semiconductor bodies, it will be understood by those skilled in the art that any semiconductor body amenable to a vapor deposition process, such as silicon, may be used as well. Furthermore, the following description is for the purposes of illustration and should not be construed as a limitation of the invention.

In a typical run, a plurality of germanium N-conductivity type wafers are provided in the heater assembly described in detail above. Thereupon, germanium P-type deposition is effected from the vapor phase onto the plurality of wafers to produce an NP semiconductor structure. The resistivity of the support wafer is relatively unchanged after the deposition of the P layer for N-type wafers having a resistivity in the order of 0.1–0.5 ohm-centimeter. For N-type wafers having a resistivity in the range 0.5 to 1 ohm-centimeter, it is desirable to subject the NP wafers to a post-heat treatment at 450–500° C. for about ½ to 1 hour to compensate for slight changes in resistivity during the deposition of the P layer.

The process of deposition of semiconductor material from the vapor phase as used herein follows in the same manner as has been practiced in the art. The semiconductor wafer is exposed to a decomposable vapor source of semiconductor atoms as, for example, germanium tetrachloride and active impurity atoms (for example, boron trichloride for P-type deposition) carried into the reactor by a diluent gas, such as hydrogen. For example, when the wafers are heated to 830° C. and are exposed for about 30 minutes to a vapor flow of approximately 240 grams of germanium tetrachloride per hour entrained in 330 liters per hour of hydrogen, together with $1.5\times10^{-3}$ cc. of boron trichloride per cc. of hydrogen, a P-type conductivity deposit is obtained having a resistivity of 0.6 ohm-centimeter.

What has been described herein is an improved method and apparatus for growing semiconductor layers from the vapor phase wherein an improved heater assembly is provided which prevents transfer of undesired impurities from the heater material itself and which moderates the temperature profile for a plurality of wafers positioned on the assembly in an improved manner.

While the invention has been described with reference to particular embodiments thereof, it is to be understood that the invention is not to be so limited, as changes and alterations therein may be made which are within the full intended scope of this invention as defined by the appended claim.

What is claimed is:

Apparatus for producing single crystal semiconductor bodies by growth from the vapor phase comprising a reaction chamber, a graphite heater element positioned within said chamber, a quartz envelope enclosing said heater element, ledges on said envelope for mounting a plurality of semiconductor wafers thereon, means for heating said heater element thereby to heat when in operation said wafers from heat from said graphite element through said quartz envelope, and means for introducing decomposable semiconductor material for deposition within said chamber on said wafers.

References Cited by the Examiner

UNITED STATES PATENTS

| | | | |
|---|---|---|---|
| 2,692,839 | 10/1954 | Christensen et al. | 118—48 X |
| 2,817,311 | 12/1957 | Nack | 118—48 |
| 2,959,504 | 11/1960 | Ross et al. | 148—33 |
| 2,975,085 | 3/1961 | Hunter | 148—33 |
| 2,989,941 | 6/1961 | Wolf | 118—48 |
| 3,001,877 | 12/1961 | Schweickert et al. | 148—1.6 X |
| 3,042,493 | 7/1962 | Reuschel et al. | 148—1.6 X |
| 3,042,494 | 7/1962 | Gusche | 148—1.6 X |
| 3,089,788 | 5/1963 | Marinace | 118—48 X |
| 3,131,098 | 4/1964 | Krsek et al. | 118—48 X |

CHARLES A. WILLMUTH, *Primary Examiner.*

DAVID L. RECK, RICHARD D. NEVIUS, *Examiners.*